Jan. 10, 1956 A. E. HUNTLEY 2,730,403
DEVICE FOR MOVING WHEEL-MOUNTED IRRIGATION PIPELINE
Filed March 9, 1953 3 Sheets-Sheet 1
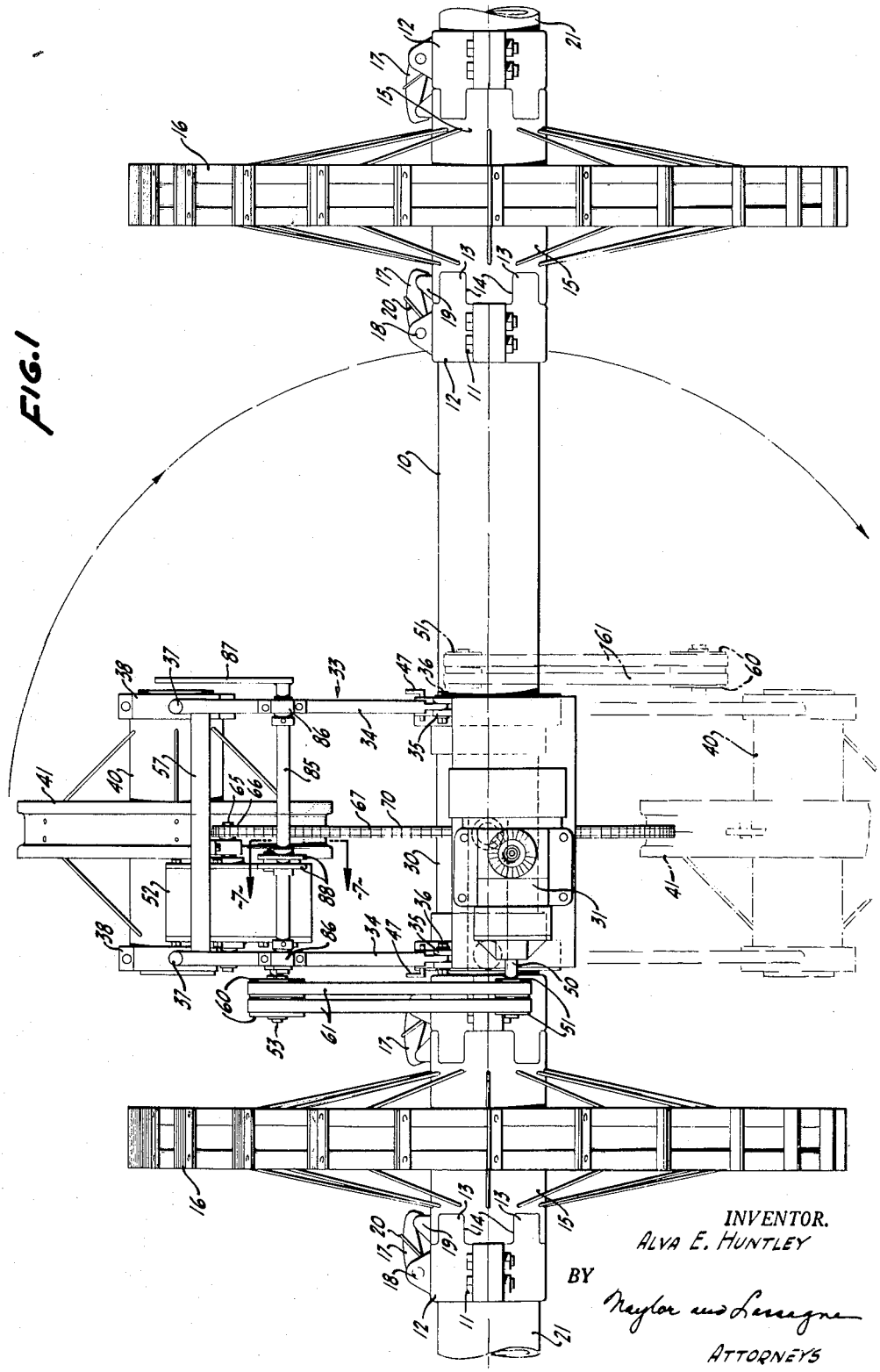
INVENTOR.
ALVA E. HUNTLEY
BY
Naylor and Lassagne
ATTORNEYS

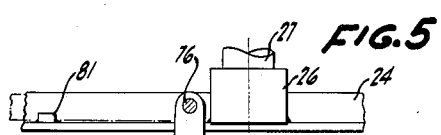
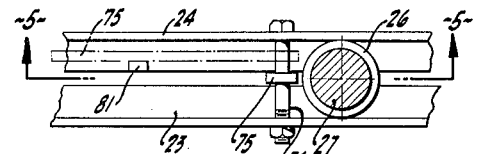
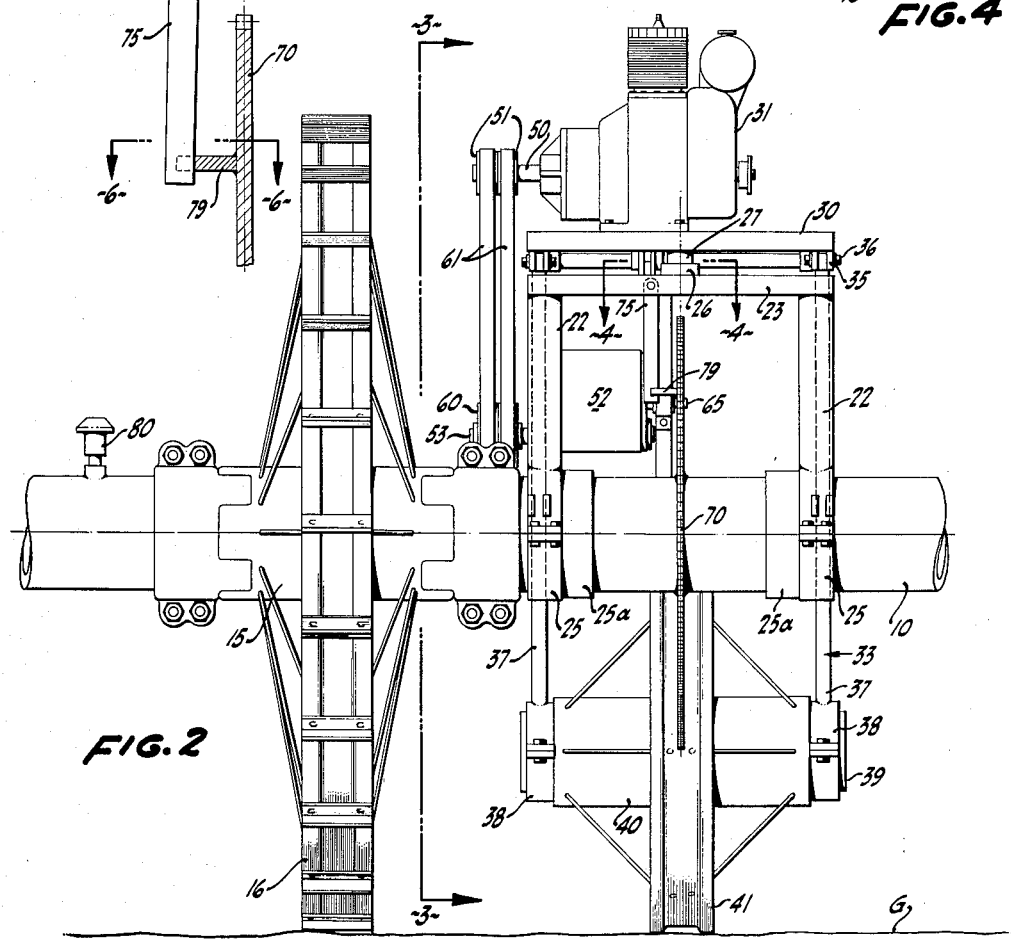
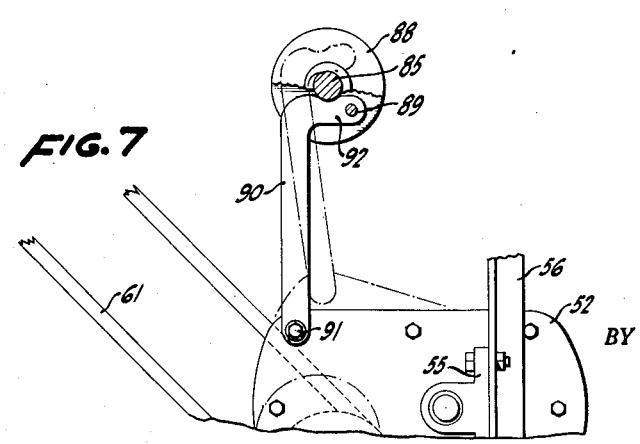
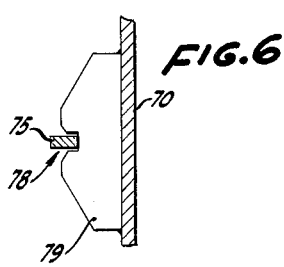
INVENTOR.
ALVA E. HUNTLEY

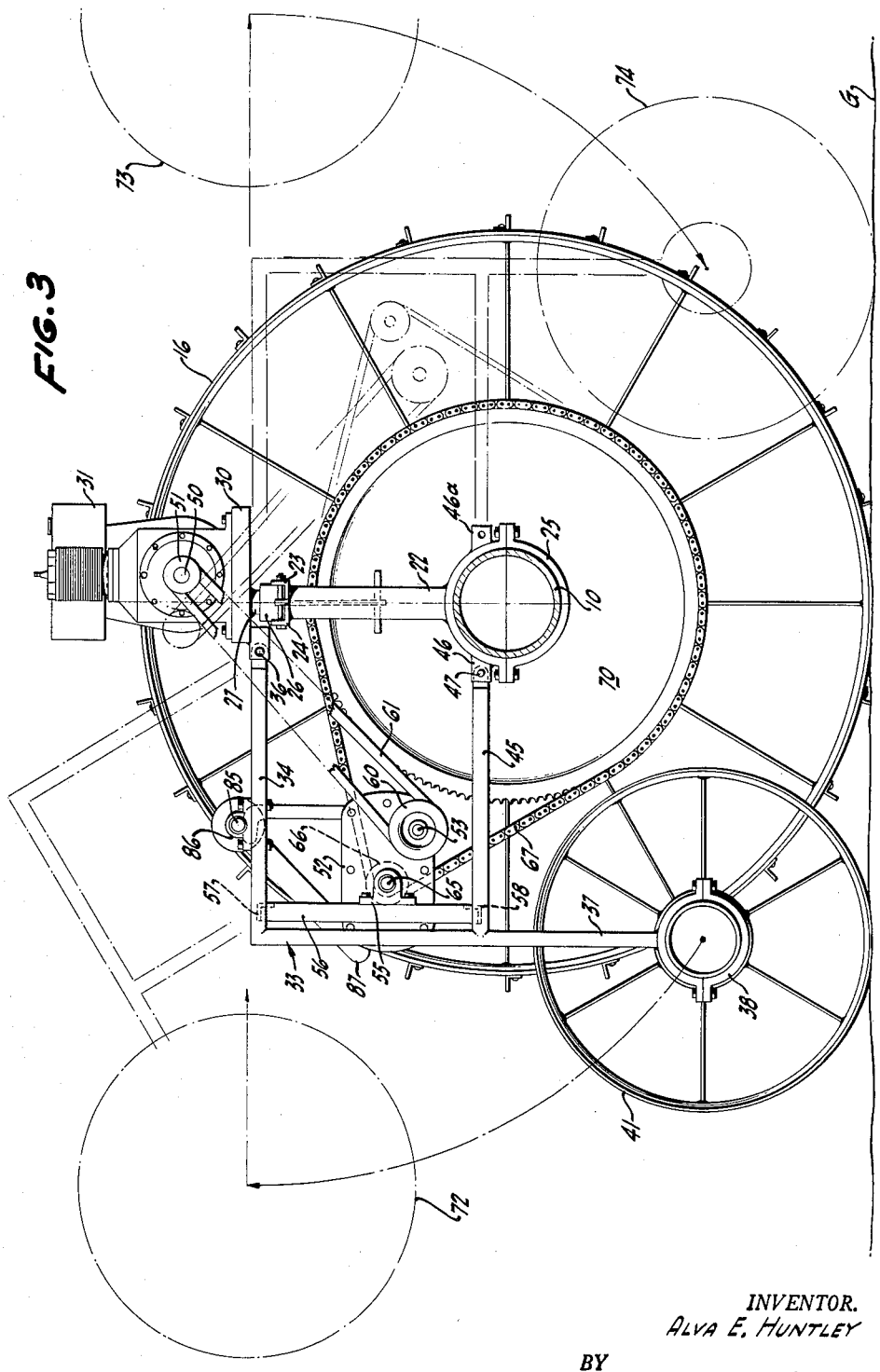

United States Patent Office 2,730,403
Patented Jan. 10, 1956

2,730,403

DEVICE FOR MOVING WHEEL-MOUNTED IRRIGATION PIPELINE

Alva E. Huntley, Portland, Oreg., assignor to Farmland Irrigation Company, Inc., a corporation of California Application March 9, 1953, Serial No. 341,288

5 Claims. (Cl. 299—47)

This invention relates to irrigation equipment, and more particularly to improvements in such equipment comprising a novel form of device for moving a wheel-mounted irrigation pipeline of the general character disclosed in Mansur Patent No. 2,516,711 dated July 25, 1950. The device of the present invention is operable to move the pipeline in either direction transversely with respect to its longitudinal axis so as to re-position the pipeline on ground to be irrigated.

An object of the invention is to provide a self-contained power-operated drive system for a wheel-mounted pipeline which is readily reversible to drive the pipeline in either of two directions.

The disclosed embodiment of the invention comprises a reversible drive system for an irrigation pipeline having a gear carried by the pipeline and adapted upon rotation to roll the pipeline in a lateral direction, a motor, a power transmitting system adapted to releasably interconnect the motor with the gear at either side of the gear, and pivotable mounting means for the motor and power transmitting system carried by a frame supported on the pipeline and adjustable so as to make possible a reversal of the interconnection between the motor and the gear without imparting any vertical movement to the motor. Means are also provided for temporarily holding the motor support in position during adjustment incident to such reversal.

Other objects and advantages of the invention will be apparent from the following description taken in conjunction with the drawings forming part of this specification, and in which:

Figure 1 is a top plan view of a portion of a wheel-mounted irrigation line equipped with the drive system of the invention, the solid and dotted line showings of the drive system indicating the two operating positions thereof;

Figure 2 is a view in front elevation of the drive system of Figure 1;

Figure 3 is a view in side elevation of the drive system of the invention, taken along lines 3—3 of Figure 2;

Figure 4 is a detail view in section; the section being taken on the line 4—4 of Figure 3;

Figure 5 is a detail view in section; the section being taken on the line 5—5 of Figure 4;

Figure 6 is a detail view in section, the section being taken on the line 6—6 of Figure 5; and Figure 7 is an enlarged detail sectional view of a portion of the drive control mechanism; the section being taken on the line 7—7 of Figure 1.

As shown in the accompanying drawings the drive unit of the present invention comprises a tubular axle 10 which is adapted to function as a section of the irrigation pipeline which is to be moved by the drive unit and which is adapted to be coupled at its ends to standard types of wheels used to support such a line. For this purpose there is clamped to each end of the tubular axle 10, by bolts 11, a split collar 12 having a plurality of lugs 13 projecting therefrom for engaging in complementary recesses 14 of the tubular hub 15 of a wheel 16 of such a wheel-mounted pipeline, so that rotation of the tubular axle 10 will effect rotation of wheel 16. Means are provided for latching the collar 12 and hub 15 in coupled relationship, comprising a hooked latch 17 pivotally mounted at 18 on the collar 12 and adapted to engage a keeper 19 on the hub 15; being releasably retained in such engagement during rotation of the assembly by a spring 20. The opposite end of each wheel hub 15 is coupled to a section of said pipeline, designated 21, by a similar arrangement. Conventional gaskets are provided in each wheel hub 15 for preventing fluid leakage between it and the tubular elements 10 and 21 during irrigation operations.

The tubular axle 10 supports a frame comprising a pair of spaced supporting arms 22 interconnected at their upper ends by a pair of spaced L-shaped bars 23 and 24 (see also Figures 4 and 5) and provided at their lower ends with split collars 25 forming sleeves adapted to be rotatably mounted on the tubular axle 10 adjacent locating collars 25a fixed to axle 10. A bearing boss 26 is carried on the bars 23 and 24 and a stub shaft 27 is rotatably disposed in the boss 26 and supports a motor platform 30 which is fixedly secured to stub shaft 27 and has bolted thereto a motor assembly 31.

The drive unit also includes outrigger support means for a gear reduction unit, said means comprising a frame 33 including a pair of outwardly extending arms 34 having ends extending between pairs of ears 35 carried by the platform 30 and pivotally connected thereto by pins 36. Frame 33 also includes vertically extending members 37 the upper ends of which are secured to arms 34 and the lower ends of which carry split clamps 38 clamped to a tubular axle 39 for the hub 40 of a support wheel 41. Frame 33 also includes a pair of horizontally extending locking arms 45 each of which has one end secured to one of the members 37 and its other end extended between a pair of ears 46 on one of the collars 25, being secured thereto by a removable locking pin 47.

Means are provided for releasably connecting the motor 31 with the tubular axle 10 to rotate the latter. For this purpose the output shaft 50 of motor assembly 31 carries a pair of sheaves 51. A gear reducer unit 52 is provided with an input shaft 53 and is pivotally mounted in pillow blocks 55 secured to a plate 56 secured to angle bars 57 and 58 carried by arms 34 and 45, respectively. A pair of sheaves 60 secured to shaft 53 are connected by continuous belts 61 with the sheaves 51. An output shaft 65 for the gear reduction unit 52 has a gear wheel 66 secured thereto and a continuous chain 67 connects gear wheel 66 with a gear 70 secured to the tubular axle 10 midway between the supports 22; the plane of gear 70 being in line with the axis of shaft 27 for a reason to be explained.

When the drive system is oriented in the position of Figure 3, operation of the motor assembly 31 is effective through the mechanism described to rotate gear 70, tubular axle 10, and to rotate wheels 16 and the entire pipeline connected thereto in a clockwise direction as viewed in said figure, to move the pipeline 21 laterally over the ground surface G. If it is desired that the gear 70 be rotated in a counterclockwise direction, with reference to Figure 3, to move the pipeline 21 in the opposite direction over the ground surface, the following procedure is followed:

The motor platform support is first temporarily locked in its normal position. For this purpose there is provided a locking bar 75 which is pivotally mounted on a rod 76 retained in the vertical flanges of the L-shaped members 23 and 24, and which may also be slid along the rod 76 so that it may either lie inactive on the horizontal flange of the L-shaped member 24 as shown in dotted lines in Figure 4, or may pivot downwardly through the gap between the horizontal flanges of members 23 and 24 as shown in Figure 5 and in full lines in Figure 4. When the locking bar 75 is in the latter position (as shown in Figure 5), it is in engagement with a notch 78 (see also Figure 6) of a member 79 secured to the gear 70; the member 79 being always in position to be thus engaged when the irrigation line is in sprinkling position with the sprinkler heads 80 extending vertically upward. Such engagement of locking bar 75 with notch 78 holds the motor platform 30 in its normal position independently of frame 33 permitting movement of the latter as will now be described, and may also be employed to prevent the irrigation line from undesired rolling under certain conditions. Chain 67, being sufficiently slack, is then removed from the small driving gear 66; locking pins 47 are removed to free the frame 33 for upward pivotal movement about pins 36; the frame 33 is then manually pivoted upwardly to a dotted line position, such as that indicated at 72 in Figure 3, wherein the wheel 41 is disposed above the tubular axle 10. The frame 33 and the motor platform 30 are then rotated 180° horizontally on the axis of shaft 47, to bring the wheel 41 to the dotted line position shown at 73; the frame 33 is then pivoted downwardly around pins 36 to bring the wheel 41 into the dotted line position indicated at 74; the locking pins 47 are then inserted through ears 46a carried by the collars 25 and through the apertured end of the arms 45 to lock the frame 33 in the new position. The chain 67 is then re-engaged with gear wheel 66; and the locking bar 75 is restored to the position in which it is shown in dotted lines in Figure 4 and retained there by a boss 81 on member 24.

It will be observed that the alignment of the vertical axis of bearing shaft 27 with the plane of gear 70 insures that the drive system is properly oriented with respect to gear 70 regardless of the side of the gear 70 at which the drive system is disposed.

Control means are provided for clutching and declutching the drive from the motor assembly 31 to gear 70 by tightening and slackening belts 61. For this purpose a shaft 85 is mounted in bearings 86 carried by arms 34 of frame 33; a handle 87 being secured to the shaft 85 for rocking it. Intermediate its ends there is secured to shaft 85 a pair of discs 88, and pivotally secured to said discs by pin 89 (Figure 7) is a control link 90, the lower end of which is pivotally connected by pin 91 to the casing of the gear reduction unit 52 at a point spaced from the pivotal mounting of said unit in pillow blocks 55. The upper end of control link 90 is shaped as shown at 92 so that rotation of shaft 85 to move the link from the position in which it is shown in full lines in Figure 7 to the position in which it is shown in dotted lines will move the unit 52 from full line to dotted line position, slackening belts 61 so as to declutch the motor from the gear 70. Reverse rocking of shaft 85 will, of course, tighten the belts so that the motor will be clutched to the gear.

From the foregoing description, it will be seen that the drive system of the invention is well adapted to obtain the objects above enumerated, and that it has the particular advantage of enabling re-orientation of the drive motor without requiring removal and reattachment of the motor.

While a specific embodiment of the invention has been shown and described, it is to be understood that modifications will be readily apparent within the spirit and scope of the invention.

What is claimed is:

1. A driving system for a wheel-mounted pipeline comprising a tubular supporting axle constituting a portion of the pipeline, a gear wheel secured to said axle, a motor, a horizontally disposed platform supporting the motor, means freely sleeved on said axle supporting said platform above said pipeline for rotation about a vertical axis disposed in the plane of rotation of said gear wheel, support means operable to maintain said platform in a horizontal position and to normally prevent rotation of said platform in a horizontal plane comprising an outrigger frame having a horizontally disposed pivotal connection with said platform and terminating in a ground-engaging wheel, said frame embodying means to normally prevent pivotal movement of said frame with respect to said platform, and means carried by said frame for interconnecting said motor and said gear wheel, including a second gear wheel disposed in the plane of rotation of said first-mentioned gear wheel.

2. A driving system for a wheel-mounted pipeline comprising a tubular supporting axle constituting a portion of the pipeline, a gear wheel secured to said axle, a motor, a horizontally disposed platform supporting the motor, means freely sleeved on said axle supporting said platform above said pipeline for rotation about a vertical axis, support means operable to maintain said platform in a horizontal position and to normally prevent rotation of said platform in a horizontal plane comprising an outrigger frame having a horizontally disposed pivotal connection with said platform and terminating in a ground-engaging wheel, said frame embodying means to normally prevent pivotal movement of said frame with respect to said platform, means carried by said frame for interconnecting said motor and said gear wheel, and releasable locking means disposed between said platform supporting means and said gear wheel for maintaining said platform in a horizontal position independently of said outrigger frame.

3. Means for supporting a pipeline in a horizontal position in spaced relation to the ground and for selectively moving said pipeline laterally in either direction comprising an axle constituting a portion of said pipeline; a pair of ground engaging wheels secured to said axle adjacent the ends thereof, a driver wheel secured to said axle between said ground engaging wheels, an upwardly extending support frame having a bearing on said axle at its lower end and supporting a platform at its upper end for rotation about a vertical axis, a motor secured to said platform, means for operatively connecting said motor to said driver wheel at either of two 180° spaced apart positions of said platform, and means for stabilizing said platform against vertical and horizontal movement in each of said two positions comprising a ground-wheel-supported outrigger frame connected to said platform for pivotal movement with respect thereto about a horizontal axis, and a member carried by said outrigger frame releasably connectable with said support frame when said platform is in either of two positions, said member being operable when connected to said support frame to lock said platform and outrigger frame against rotation about said vertical axis.

4. In combination, a first ground engaging wheel having an axle secured thereto, a horizontally disposed pipeline connected to said axle, a frame rotatably sleeved on said axle, and outrigger support means operable to maintain said frame in an upwardly extending position with respect to said axle, said support means comprising a second ground engaging wheel disposed in parallel spaced relation with respect to said first wheel, said second wheel having its axis of rotation laterally offset with respect to the axis of said pipeline and disposed at a lower level than said pipeline axis, frame means supporting said second wheel for rotation, said frame means being connected to said axle frame for both horizontal and vertical pivotal movement and including a member adapted to be releasably connected to said axle frame at either side thereof at a point vertically spaced from the points of pivotal connection between said frame means and axle frame.

5. In combination, a first ground engaging wheel, an axle secured thereto, a pipeline connected to said axle, a frame having a free bearing connection with said axle, and outrigger support means operable to maintain said frame in an upwardly extending position with respect to said axle, said support means comprising a second ground engaging wheel disposed in parallel spaced relation with respect to said first wheel, frame means supporting said second wheel for rotation, said frame means having a pivotal connection with said axle frame adapting said frame means and second wheel to be swung vertically above the level of said axle, and said frame means having a pivotal connection with said axle frame adapting said frame means and second wheel to be horizontally swung through an angle of at least 180°, and means for releasably connecting said frame means to either side of said axle frame to maintain said wheels in parallelism in engagement with the ground.

References Cited in the file of this patent

UNITED STATES PATENTS 2,582,416     Cornelius _____ Jan. 15, 1952